(12) United States Patent
Hirsch et al.

(10) Patent No.: US 12,052,996 B2
(45) Date of Patent: Aug. 6, 2024

(54) DEVICE AND METHOD FOR PROCESSING DOUGH

(71) Applicant: ALBERT HANDTMANN MASCHINENFABRIK GMBH & CO. KG, Biberach (DE)

(72) Inventors: Rudolf Hirsch, Weingarten (DE); Daniel Teufel, Schemmerhofen (DE); Karlheinz Kaestle, Laupheim (DE); Manfred Baechtle, Schemmerhofen (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 660 days.

(21) Appl. No.: 17/152,615

(22) Filed: Jan. 19, 2021

(65) Prior Publication Data

US 2021/0298315 A1 Sep. 30, 2021

(30) Foreign Application Priority Data

Mar. 27, 2020 (EP) .................................... 20166147

(51) Int. Cl.
*A21C 5/00* (2006.01)
*A21C 3/10* (2006.01)

(52) U.S. Cl.
CPC . *A21C 5/00* (2013.01); *A21C 3/10* (2013.01)

(58) Field of Classification Search
CPC ........ A01J 25/005; A01J 25/00; A01J 25/008; A01J 25/12; A21C 5/00; A21C 3/10

USPC ......... 99/452–454, 460, 464, 476, 489, 494, 99/516, 535
See application file for complete search history.

(56) References Cited

U.S. PATENT DOCUMENTS

| 1,702,191 A | 2/1929 | Bergner |
| 2,669,195 A | 2/1954 | Pellegrino |
| 4,012,532 A | 3/1977 | Moore et al. |
| 4,820,470 A * | 4/1989 | Ferrero .................. B29C 48/06 264/141 |

FOREIGN PATENT DOCUMENTS

| CN | 202425510 U | 9/2012 |
| CN | 104918496 A | 9/2015 |
| DE | 4417336 A1 | 8/1995 |
| JP | 2002325538 A | 11/2002 |

OTHER PUBLICATIONS

China National Intellectual Property Administration, Office Action and Search Report Issued in Application No. 202110285158.8, Feb. 18, 2023, 18 pages. (Submitted with Partial Translation).

* cited by examiner

*Primary Examiner* — Phuong T Nguyen
(74) *Attorney, Agent, or Firm* — McCoy Russell LLP

(57) ABSTRACT

The invention relates to a device and a method for processing dough, in particular a dough divider, with a pump device and an adjoining tube. There is at least one ventilation device arranged in a region between the pump device and the outlet opening of the tube and can introduce a gaseous medium between the tube inner wall and the outer skin of the dough.

14 Claims, 4 Drawing Sheets

DEVICE AND METHOD FOR PROCESSING DOUGH

CROSS REFERENCE TO RELATED APPLICATION

The present application claims priority to European Patent Application No. 20166147.7 filed on Mar. 27, 2020. The entire contents of the above-listed application is hereby incorporated by reference for all purposes.

TECHNICAL FIELD

The invention relates to a device for processing dough, in particular a dough divider for the food industry and a corresponding method according to the preambles of claims 1 and 10.

BACKGROUND AND SUMMARY

Devices and methods for processing dough, in particular dough dividers, are already known from prior art. Doughs for the industrial production can be processed mechanically with appropriate devices.

For example, doughs can be kneaded, conveyed, and divided into individual portions.

During machine processing, the dough comes into contact with various material surfaces. The dough is moved along these material surfaces using, for example, pumps.

Mainly the tendency to adhesion or stickiness of the dough is a property that makes machine processing difficult. The stickiness of doughs increases with increasing water content and with increasing dough yield, respectively. The dough yield is the numerical ratio between the amount of food solids used in the dough, i.e. in particular cereal products, and the amount of bulk liquid such as water, milk, oils, etc. A high dough yield is characteristic of a soft dough, a low dough yield for a firmer dough. Mechanical stress on doughs can also cause the stickiness of the dough to increase. In this application, dough is understood as meaning food solids to which bulk liquid has been added, in particular in the form of a comminuted (in particular ground) cereal product or plant product, e.g. bread dough. In addition to food dough, the term dough also includes doughs for animal food.

Adhesion to these material surfaces arises due to of the stickiness of the dough. If the dough is now moved along the material surface, two effects arise:

Firstly, the adhering dough is repeatedly detached from the material surface, causing an adhesion tear. Secondly, there is a ring-shaped structural tear between the layer of dough adhering to the material surface and the remainder of the moving dough volume, i.e. a cohesive tear arises.

Which effect predominates depends on factors such as dough consistency, properties of the material surface or speed of motion. The aforementioned two effects depend on friction. At a higher pressure, for example, when pumping the dough through tubes, there is greater friction.

The friction between the dough and the material surface is accompanied by mechanical stress on the dough layer located on the material surface. This mechanical stress therefore leads to structural damage in the dough layer at the surface, which is accompanied by the release of water previously bound in the dough structure. This released water results in undesirable increased stickiness of the dough surface. In addition to the disadvantageous increased stickiness, the friction described also negatively affects the product quality due to the structural damage.

Mechanical stress (for example, shear, pressure load, stretching, compression) of dough arises, as described above, in particular when the dough is in contact with the material surfaces and is moved along them. This is also the case when kneading, dividing the dough, shaping or processing.

The effect of an increase in dough stickiness in the course of the dough dividing process is particularly problematic. In the process step of dividing the dough, the dough coming from the kneader is divided into individual portions. Downstream of the dough divider, these individual portions are transported on conveyor belts and further processed, for example, rounded.

The stickier the dough is after the dough dividing process, the more the dough tends to adhere to the conveyor belts used for its transport or to molding devices and to contaminate them with product residues.

It has already been attempted to reduce the friction between the dough and the material surface by introducing a liquid film, for example, water or oil. However, this has the disadvantage that, firstly, these liquid release agents remain in the product, and, secondly, excess release agent has to be collected again. Downstream systems tend to be soiled by excess release agent, as e.g. added water in turn increases the stickiness of the dough. As a consumable material, release agents are also a decisive cost factor (e.g. oil as a release agent). In addition, possible release agent inclusions in the dough reduce the product quality.

Proceeding from there, the present invention is based on the object of providing a device for processing dough, in particular, a dough divider, as well as a corresponding method which make it possible to reduce the stickiness of dough on its surface in a simple manner and, in particular, to prevent structural damage to the dough caused by friction during machine processing.

According to the invention, this object is satisfied with the features of claims 1 and 10.

The device according to the invention for processing dough, in particular a dough divider, comprises a pump device with which dough, which has been, for example, previously kneaded, is conveyed toward an outlet opening in a downstream tube having a free cross-section. The dough is then ejected via the outlet opening of the tube and can be severed there by way of a separating device.

A tube with a free cross-section is understood to mean that no mixing tube is meant, but a tube in which a strand of dough with a closed outer skin can be conveyed. Meaning. the tube comprises no further devices in the interior for mixing, in particular no mixer, no flow breaker, no device for dividing the strand of dough into a plurality of individual strands. What is meant is only an empty tube in which possibly another e.g. tapered mold part can be inserted in order to, in particular, continuously reduce the diameter.

A strand of dough with a closed outer skin is understood to mean a continuous strand. The outer skin comprises e.g. a substantially cylindrical outer contour, i.e. a shape complementary to the inner wall.

In order to minimize the friction between the dough and the material surface along which the dough moves, an aeration device is provided which can introduce a gaseous medium between the tube inner wall and the outer skin of the dough. This creates an air buffer around the closed outer skin of the dough such that friction can be reduced significantly. This reduces the mechanical stress on the dough, which reduces structural damage in the surface layer of the dough as well as the release of water. At the same time, the gaseous medium also dries off moisture on the surface of the dough, thus reducing the dough's tendency to stick. As a result, the dough can be conveyed and possibly portioned more gently and a better product quality can be obtained. Overall, the result is that the dough is less sticky on its surface. This is also advantageous for downstream processing steps. For example, the stickiness on downstream conveyor belts can be minimized. In the case of downstream rounding, additionally blowing gas onto the dough can be dispensed with or it can at least be greatly reduced.

Overall, discard can thus also be reduced, thereby also reducing the raw material costs. Furthermore, an increase in productivity, process stability and improved hygiene arises for the reason that there is no adhesion of dough to the tube inner wall The tube inner wall is that inner wall of the tube which faces the dough and is in contact with the gaseous medium.

In the present invention, the gaseous medium should not be incorporated into the dough, but should remain outside the dough between the strand of dough and the tube inner side.

One or more ventilation devices can be provided there.

According to a preferred embodiment, the ventilation device can comprise at least one opening in the tube through which the gaseous medium can be supplied, where the at least one opening is a gap, in particular an annular gap, or formed as openings distributed around the circumference of the tube, in particular, as a perforated ring or in the form of sintered material.

The gaseous medium can therefore flow in between the outer skin of the dough and the tube inner wall via the at least one opening and can be distributed around the outer skin of the dough and move in the direction toward the outlet opening.

A ventilation device is advantageously located in the end region of the tube. This means that the at least one opening can be spaced approximately 2 to 150 mm from the outlet opening. The selective ventilation within the outlet region of the tube results in a greater reduction in surface moisture with less effort than is the case, for example, with ventilation on a downstream conveyor belt. This means that the ejected dough is ideally prepared for downstream processes.

The ventilation device advantageously comprises a device which can supply the gaseous medium under pressure, in particular, a pump, a compressor or a pressure vessel, for example a gas cylinder, etc. If the pressure of the gaseous medium supplied is higher than the pressure in the tube, then the gaseous medium can be introduced accordingly.

For this purpose, the ventilation device can comprise, for example, an annular distribution chamber through which the gaseous medium can be passed into the opening (s). This ensures uniform distribution of the gaseous medium around the circumference of the dough conveyed.

The tube that connects to the pump can be, for example, an outlet tube or, in the case of a longer transport path, a transport tube and a downstream outlet tube, where the transport tube is preferably longer than the outlet tube. It is also possible that the outlet tube optionally comprises a mold insert for shaping the dough, which insert has, for example, a smaller inner diameter than the outlet tube itself. A respective mold insert is, for example, exchangeable.

A separating device, for example a rotary knife, can be provided downstream of the outlet opening for portioning the dough.

If, for example, a mold part is inserted in the outlet tube, then the inner wall of the mold part forms the tube inner wall, where the opening for the introduction of the gaseous medium then extends e.g. through the mold part such that the gaseous medium can flow in between the tube inner wall and the skin surface of the dough. Alternatively or in addition, the at least one opening can be formed in the wall of the outlet tube upstream of the inserted format part.

In the case of a longer transport path, it is advantageous to have several ventilation devices be arranged consecutively in direction of transport T. This is advantageous for the reason that the longer the tube, the greater the stress on the dough. This is especially important if the transport tube is not straight, but rather exhibiting at least one bend. The several ventilation devices can be connected, for example, by way of lines, to a common pump, compressor or a common pressure vessel.

It is also possible that at least one additional nozzle is arranged in direction of transport T downstream of the outlet opening of the tube and downstream of a separating device, and is in particular directed such that gaseous medium can be blown onto the face sides of the severed dough. A nozzle can there be provided that blows gaseous medium onto the face side (cutting surface) which, when viewed in the direction of transport, is the leading one, and/or a nozzle that blows gaseous medium onto the face side (cutting surface) of the divided dough portions which, when viewed in the direction of transport, is the trailing one.

In the method according to the invention for processing, in particular dividing dough with, in particular, a device according to at least one of the claims 1 to 9, dough is conveyed by a pump device through a tube with a free tube cross-section and a gaseous medium is introduced between the tube inner wall and the outer skin of the strand of dough by way of a ventilation device.

The gaseous medium can then move in direction of transport T in the direction of the outlet opening of the tube. This creates an air cushion between the outer skin of the dough and the tube inner wall.

The gaseous medium comprises at least one gas from the following group: compressed air, purified compressed air, inert gas. The gaseous medium can be dried, e.g. dried air. The gaseous medium can either be formed from the above gases or be a mixture of different gases and/or be an aerosol, i.e. comprise aerosol particles, such as oil.

The pressure of the gaseous medium can advantageously be adjusted (e.g. by way of the pump or compressor output, by way of a control valve or check valve, etc.) and in particular be higher than the pressure in the tube. The volume flow of the gaseous medium can therefore be adapted to the type of dough and also, for example, to the diameter of the strand of dough, for example, when mold parts are used.

A separating device can be provided at the outlet end of the tube and divides the strand of dough into individual portions. The dough can then be conveyed onward, for example, on a further transport device, for example, a conveyor belt, or it can already be filled, for example, in molds.

After leaving the tube, it is also possible to have gaseous medium be blown onto the divided dough at its leading and/or trailing faces side by way of one or more further nozzles. The nozzles are e.g. arranged in such a way that the remaining part of the portion has not yet been severed or is being severed when the face side, which when viewed in the direction of transport is the leading one, is subjected to blowing. The nozzles are spaced e.g. 5 cm-50 cm from the outlet opening when viewed in the axial direction of the tube.

According to the present invention, it is therefore possible that an air cushion is created around the outer skin of the strand of dough between the inner wall of the tube and the closed outer skin of the dough and has in particular a thickness of d=0.05 mm-3 mm, where the tube in particular has a diameter of 30 mm-120 mm.

BRIEF DESCRIPTION OF THE FIGURES

The present invention shall be explained below in more detail with reference to the following figures.

DETAILED DESCRIPTION

Figure 1:
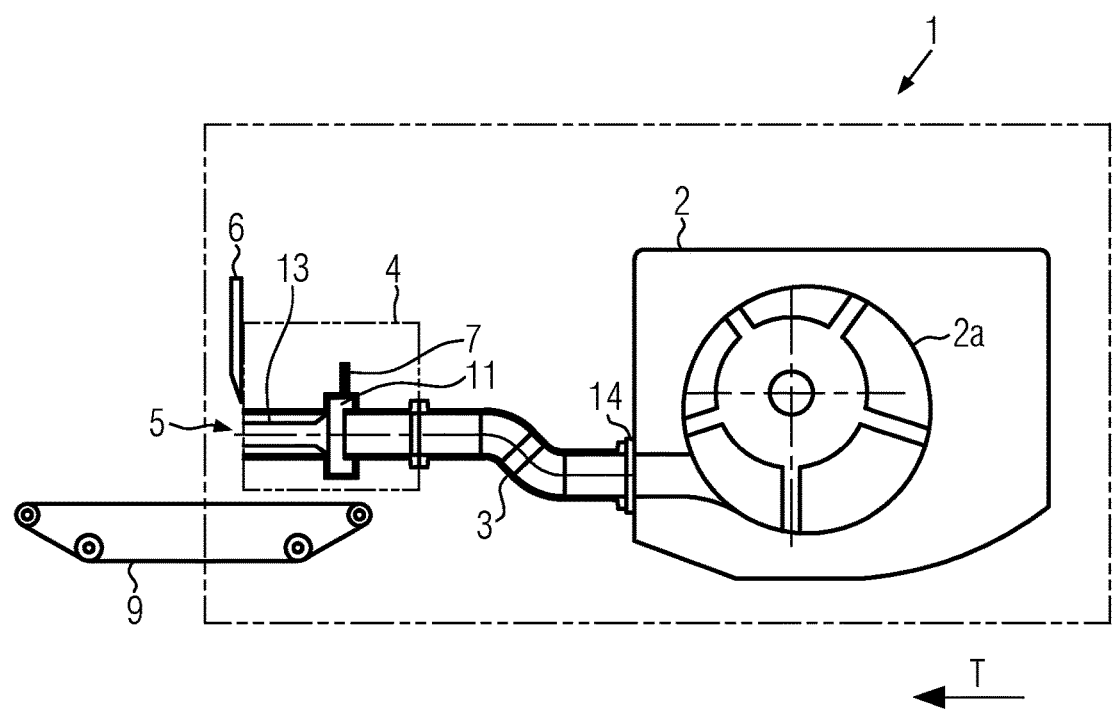
FIG. 1 shows schematically an embodiment according to the present invention.

FIG. 1 shows very schematically a sectional view through a dough divider 1 according to the present invention. The device according to the invention comprises a pump device 2, presently meaning the pump unit comprising a conveying mechanism 2a, for example, in the form of a vane pump. Pump device 2 can pump, for example, dough from a filling hopper or a mixing container with a mixer at its lower end and pump it in the form of a strand of dough into a tube 4, 3 adjoining pump device 2. The tube is presently composed, for example, of a transport tube 3 and an outlet tube 4, where tube 3, 4 comprises an outlet opening 5 through which strand of dough 10 conveyed can be ejected. The tube, presently transport tube 3, is connected to pump device 2 by way of a tube flange 14. In this embodiment, a further transport device, for example, in the form of a conveyor belt 9, can be provided downstream of outlet opening 5, for example, in direction of transport T.

Device 1, presently configured e.g. as a dough divider, also comprises a separating device 6, presently, for example, in the form of a movable knife, which can sever dough in portions from the strand of dough conveyed.

Figure 7:
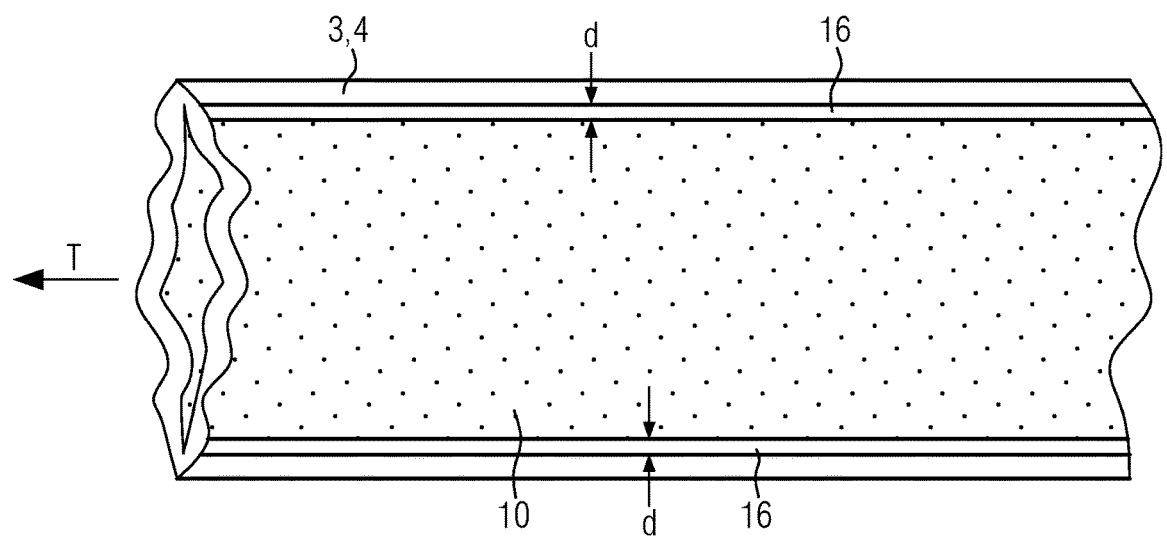
FIG. 7 shows schematically a partial sectional view through a tube with a strand of dough and an enveloping air cushion.

According to the present invention, it is therefore possible that an air cushion shown in FIG. 7 between the tube inner wall and the closed outer skin of the strand of dough is created around the outer skin of the strand of dough and in particular has a thickness of d=0.05 mm-3 mm and the tube in particular has a diameter of 30 mm-120 mm, where the divided strand of dough then also in particular has a length that substantially corresponds to the diameter of the tube (+/−20%) or is longer than the diameter of the tube (e.g. up to 120 mm or longer).

According to the present invention, at least one ventilation device 7 is provided in a region between pump device 2 and outlet opening 5 of tube 3 and is configured such that a gaseous medium can be introduced between the tube inner wall and the outer skin of the dough.

Figure 2:
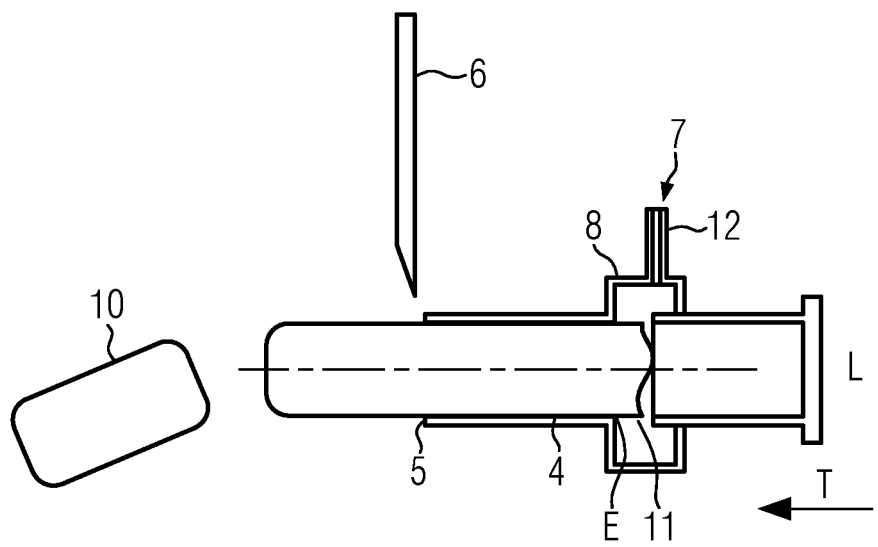
FIG. 2 shows schematically a longitudinal sectional view through an outlet tube according to the present invention.

FIG. 2 shows ventilation device 7 in greater detail. FIG. 2 shows a longitudinal sectional view through an outlet tube 4 which can be connected to the pump device or a transport tube 3. Outlet tube 4 comprises an opening 11 through which ventilation device 7 can supply the gaseous medium. The at least one opening 11 can be configured, for example, as a gap, for example, an annular gap, or as openings distributed around the circumference of the tube, in particular as a perforated ring. The openings can be arranged differently. It is essential that the gaseous medium can be introduced around the skin surface. The openings can also be configured in the form of sintered material, meaning around central longitudinal axis L of outlet tube 4.

In the case of a gap, the latter has, for example, a width in a range from 0.02 to 5 mm. The gap width can be fixed or adjustable in that outlet tube 4 is connected to transport tube 3 by way of a thread. An annular distribution chamber 8, through which the gaseous medium can be passed into at least one opening 11, is arranged around gap 11. Annular distribution chamber 8 can be connected by a line 12 to a device that can supply the gaseous medium under pressure, in particular a pump, for example, a compressor for compressed air or a pressure vessel, for example, a gas cylinder. The pressure and/or the volume flow of the gaseous medium can there be adjusted. Annular distribution chamber 8 is only one possible embodiment. However, it is particularly advantageous for distributing the gaseous medium uniformly around the circumference of the outer skin of strand of dough 10.

In this embodiment, ventilation device 7 is arranged on the outlet tube, meaning presently in an outlet region, such that opening 11, meaning end E, which when viewed in the axial direction L is the leading one, is about 2 to 150 mm away from outlet opening 5. The selective ventilation within the outlet region results in a greater reduction in surface moisture with less effort than would be the case, for example, with ventilation on a downstream conveyor belt 9. Overall, ventilation device 7 entails the following advantages:

An air buffer 16 is created, as shown in FIG. 7, around the closed outer skin of the strand of dough so that friction can be reduced significantly. This reduces the mechanical stress on the dough, which also reduces structural damage in the surface layer of the dough as well as the release of water. At the same time, the gaseous medium also dries off moisture on the surface of the dough, thus reducing the dough's tendency to stick. As a result, the dough can be conveyed and possibly be portioned more gently and a better product quality can be obtained. Overall, the result is that the dough is less sticky. This is also advantageous for subsequent process steps. For example, the stickiness on subsequent conveyor belts can be minimized. In the case of a subsequent rounding, additionally blowing gas onto the dough can be dispensed with, or it can at least be greatly reduced.

Overall, discard can thus also be reduced, thereby also reducing the raw material costs. Furthermore, an increase in productivity, process stability and improved hygiene arises for the reason that there is no adhesion of dough to the tube inner wall.

Figure 3:
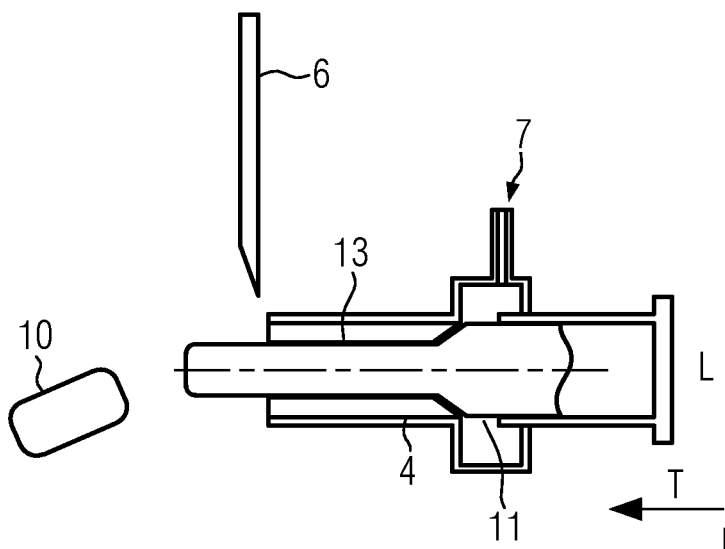
FIG. 3 shows schematically a longitudinal sectional view through an outlet tube with a mold part according to a further embodiment of the present invention.

FIG. 3 shows a further embodiment of the present invention which corresponds substantially to the previous embodiments. A mold part in the form of a molded insert 13 is there additionally inserted into outlet tube 4. The shape, for example, the diameter of the dough, can be adjusted— presently reduced, using a mold part 13. Different mold parts can be used in outlet tube 4 for producing a desired product. In this embodiment, opening 11 is arranged in direction of transport T upstream of mold part 13. Mold part 13 closes off tightly with outlet tube 4. The inner wall of mold part 13 now forms the tube inner wall past which dough 10 slides and between which and dough 10 the gaseous medium flows. This solution has the advantage that conventional mold parts 13 can be used.

Figure 4:
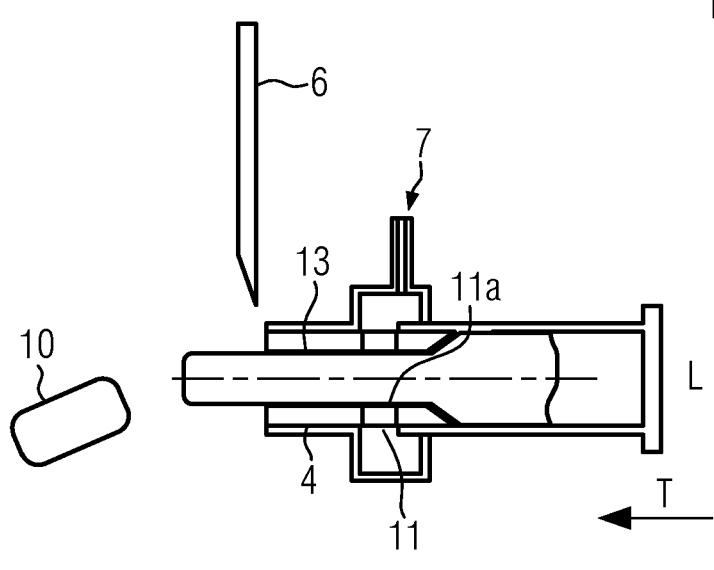
FIG. 4 shows very schematically a longitudinal sectional view through an outlet tube with a mold part according to a further embodiment of the present invention.

FIG. 4 shows a further embodiment according to the present invention which corresponds substantially to the previous embodiments, where outlet tube 4 as well comprises a mold part 13 that has a smaller diameter than outlet tube 4. In contrast to the embodiment shown in FIG. 3, opening 11 is not directly upstream of the mold part, but opening 11 extends through outlet tube 4 and through mold part 13 such the gaseous medium can flow between strand of dough 10 and the tube inner wall of mold part 13 and form the air buffer at this point. In order for mold part 13 to be precisely aligned, a locking device (not shown), for example a stop, latching device, etc., can be provided there. This ensures that opening 11a in mold part 13 is correctly aligned with opening 11.

Figure 5:
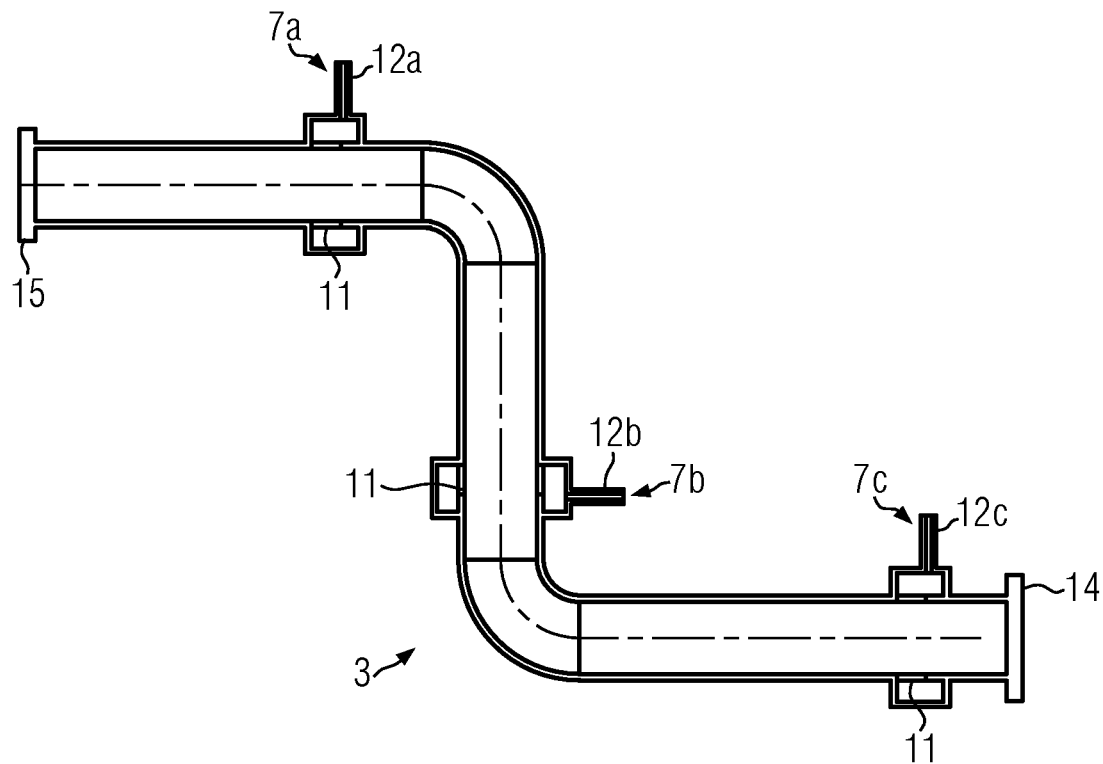
FIG. 5 shows very schematically a longitudinal sectional view through an outlet tube and a transport tube with several ventilation devices according to a further embodiment of the present invention.

FIG. 5 shows a further embodiment according to the present invention which corresponds substantially to the previous embodiments. The longer a tube, the greater the stress on the dough. In such cases, it is advantageous to additionally provide ventilation devices 7a, b, c at one or preferably at several points in the tube. FIG. 5 shows a transport tube 3 which can be connected to a pump device 2 and at the end 15 of which either an outlet tube 4 can be connected or outlet opening 5 is formed. Ventilation devices 7 a, b, c are configured as described above and can be connected via respective lines 12a, 12b, 12c to a device, not shown, which can supply the gaseous medium under pressure, for example as described above, a pump, a compressor, a pressure vessel etc.

This can ensure that the air flow between dough 10 and the tube inner wall does is not interrupted to the degree possible. The distance between two adjacent ventilation devices 7 a, b, c is, for example, in a range of 5 cm to 50 cm of the transport path of the dough.

Figure 6:
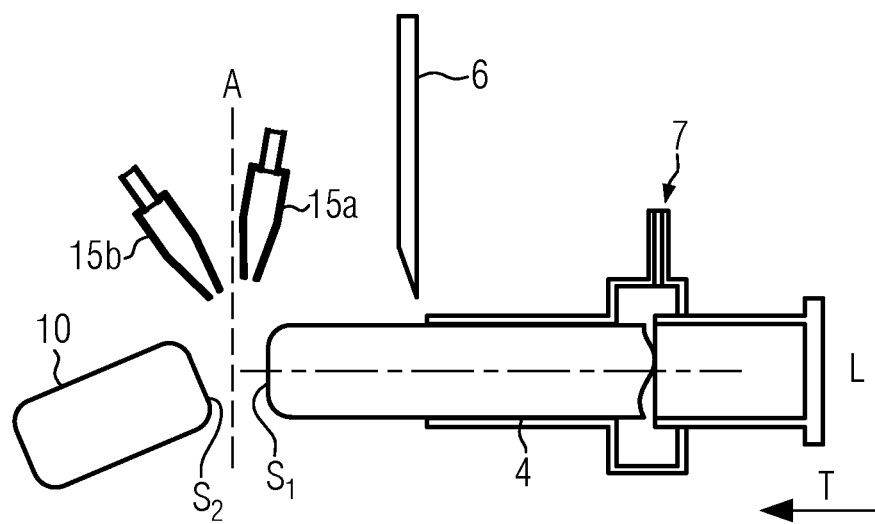
FIG. 6 shows a longitudinal sectional view through an outlet tube according to a further embodiment of the present invention.

FIG. 6 shows a further embodiment according to the present invention which corresponds substantially to the previous embodiments. Additional nozzles 15a and 15b are provided there which are arranged outside outlet tube 4 and via which a gaseous medium can be blown onto the two face sides of the severed dough. Nozzles 15a, 15b are directed relative to an axis A which is perpendicular to central axis L of outlet tube 4. For example, nozzles 15a, 15b are inclined at an angle of 0° to +/−85° relative to axis A, such that the face sides (cut surfaces) can be subjected to blowing. Nozzle 15b can blow onto leading face side S1 of the dough that has not yet been divided and nozzle 15a can blow onto trailing face side S2 of the already divided dough. This means that the gaseous medium is blown via ventilation device 8 onto the outer skin of the dough all around and also blown onto the face sides so that the entire outer surface of the dough can be subjected to blowing and therefore has less moisture and is less sticky and can be better processed for subsequent processes. The nozzles are therefore located in a region up to 50 cm from outlet opening 5.

The method according to the invention shall be described below in more detail with reference to FIG. 1.

First, a dough, for example, a bread dough, can be produced in a container (not shown) by mixing and kneading the individual components of the dough. The dough is then pumped into tube 3, 4 in direction of transport T by pump device 2, for example, presently the vane pump.

In the outlet region of the tube, for example, presently in an outlet tube 4, a gaseous medium is introduced between the tube inner wall and the outer skin of dough 10 by way of a ventilation device 8.

The gaseous medium can be or comprise at least one medium from the following group: compressed air, purified compressed air, inert gas, or an aerosol, etc. The pressure of the gaseous medium supplied is higher than the pressure in tube 4.

The pressure of the gaseous medium is, for example, in a range from 1 to 10 bar, whereas the pressure in outlet tube 4 is in a range from 0.1 bar to 8 bar. The delivery rate can be in a range of 10-120 l/min. The pressure of the gaseous medium supplied is adjustable and can therefore be adapted to the different processes, in particular also to the diameter of the strand of dough. However, this also means that if there are different ventilation devices 7 in the direction of transport, as shown for example in FIG. 5, the pressure of the medium supplied can also differ, i.e. can be set differently, in particular the pressure of the medium supplied in the region of the format part with a decreasing diameter.

Due to the fact that the gaseous medium is supplied, a gas cushion 16 forms between the outer skin of the dough and the tube inner wall, where the gaseous medium also flows in the direction of outlet opening 5. A separating device 6 is provided downstream of outlet opening 5 and can sever the dough from the strand of dough to form individual portions. The dough can then be transported onwards on transport device 9, presently on conveyor belt 9, for further processing.

As has been explained in the context of FIG. 6, the face sides of the severed portions can also be dried and be subjected to blowing with the aid of additionally arranged nozzles 15a, b. The dough can thus be dried over the entire surface.

The invention claimed is:

1. A device for processing dough, the device comprising:
a dough divider with a pump device and an adjoining tube having a free tube cross-section through which a strand of dough is transported, wherein a ventilation device is arranged in a region between said pump device and an outlet opening of said tube and introduces a gaseous medium between a tube inner wall and a closed outer skin of said strand of dough,
wherein said ventilation device comprises at least one opening in said tube through which said gaseous medium is supplied, and wherein said at least one opening is configured as a gap or as openings distributed around the circumference of said tube, and
wherein said ventilation device comprises an annular distribution chamber through which said gaseous medium is passed into said opening(s).

2. The device according to claim 1, wherein said at least one opening is configured as an annular gap or a perforated ring or in the form of sintered material.

3. The device according to claim 2, wherein said at least one opening is spaced approximately 2-150 mm from said outlet opening.

4. The device according to claim 1, wherein said ventilation device comprises a device which supplies said gaseous medium under pressure, and wherein the device is a pump, a compressor, or a pressure vessel.

5. The device according to claim 4, wherein said tube comprises either:
an outlet tube, or a transport tube and a downstream outlet tube, and wherein said outlet tube comprises at least one of:
   a mold part for shaping said dough, and
   a separating unit for dividing said strand of dough is arranged downstream of said outlet opening.

6. The device according to claim 5, wherein a mold part is inserted into said outlet tube and its inner wall forms the tube inner wall, and wherein said at least one opening for introducing said gaseous medium extends through at least one of said mold part and said at least one opening is formed in the wall of said outlet tube upstream of said mold part inserted.

7. The device according to claim 5, wherein several ventilation devices are arranged consecutively in the direction of transport in said tube, in particular at least one ventilation device is arranged in said transport tube.

8. The device according to claim 1, wherein at least one additional nozzle is arranged in the direction of transport T downstream of said outlet opening and downstream of a separating device and is directed such that gaseous medium is blown onto at least one face side of said severed dough.

9. Method for processing, in particular dividing dough, in particular with a device according to claim 1, wherein
   a strand of dough is conveyed by a pump device through a tube having a free cross-section and a gaseous medium is introduced between the tube inner wall and the closed outer skin of said strand of dough by way of a ventilation device.

10. The method according to claim 9, wherein said gaseous medium moves in the direction of transport T in the direction of said outlet opening of said tube.

11. The method according to claim 9, wherein the gaseous medium is or comprises at least one gas from the following group: compressed air, purified compressed air, dried compressed air, inert gas, and/or an aerosol which comprises aerosol particles.

12. The method according to claim 9, wherein the pressure of said gaseous medium is adjustable, and in particular is higher than the pressure in said tube.

13. The method according to claim 9, wherein a separating device is provided at the outlet end of said tube and divides said strand of dough into individual portions.

14. The method according to claim 9, wherein an air cushion is created between said tube inner wall and said closed outer skin of said strand of dough around said outer skin of said strand of dough and in particular has a thickness of d=0.05 mm-3 mm, where said tube has a diameter of 30 mm-120 mm and said divided strand of dough has in particular a length which corresponds substantially to the diameter of said tube (+/−20%) or is longer than the diameter of said tube.

* * * * *